United States Patent [19]

Oppermann et al.

[11] Patent Number: 4,898,084
[45] Date of Patent: Feb. 6, 1990

[54] SENSOR-CONTROLLED HYDRAULIC SYSTEM WITH ELECTROVISCOUS FLUIDS

[75] Inventors: Günter Oppermann; Fritz Feld, both of Leverkusen, Fed. Rep. of Germany

[73] Assignee: Bayer Aktiengesellschaft, Leverkusen, Fed. Rep. of Germany

[21] Appl. No.: 282,231

[22] Filed: Dec. 8, 1988

Related U.S. Application Data

[63] Continuation of Ser. No. 172,669, Mar. 24, 1988, abandoned, which is a continuation of Ser. No. 19,894, Feb. 27, 1987, abandoned.

[30] Foreign Application Priority Data

Mar. 22, 1986 [DE] Fed. Rep. of Germany ....... 3609861

[51] Int. Cl.$^4$ .............................................. G01N 27/00
[52] U.S. Cl. .................................................... 73/118.1
[58] Field of Search ............... 137/807, 827; 73/118.1, 73/861.08; 324/65 R, 71.1

[56] References Cited

U.S. PATENT DOCUMENTS

| | | | |
|---|---|---|---|
| 3,466,927 | 9/1969 | Magrini | 73/861.08 |
| 4,033,892 | 7/1977 | Stangroom | 252/76 |
| 4,422,001 | 12/1983 | Weiss | 310/328 |

*Primary Examiner*—Robert R. Raevis
*Attorney, Agent, or Firm*—Sprung Horn Kramer & Woods

[57] ABSTRACT

A system-integrated motion sensor is provided for monitoring and adjusting EVF system. The motion sensor is based on the concept that, with the aid of electrodes (4,5) that are already present and which are used for the viscosity control of the EVF in a hydraulic system, an electric current signal is simultaneously produced which is directly related to the rate of flow of the EVF between the electrodes. The electrodes are either stationary or can be displaced with respect to each other. Thus the motion sensor consists of the electrodes with the intermediate EVF layer and a circuit connected to the electrodes for measuring the electric signal produced by the motion. The measured signal thus obtained can advantageously be used for adjusting or controlling the viscosity of the EVF layer. For this purpose the measured signal is compared with a preadjusted value and the difference is used for controlling a high-voltage device which provides an output voltage dependent on the control voltage. This output voltage is fed back to the electrodes of the EVF layer and in turn influences the viscosity. Thus the measuring sensor for the motion, that is the EVF layer together with the associated electrodes, simultaneously forms the regulating unit for controlling the motion.

9 Claims, 7 Drawing Sheets

SENSOR-CONTROLLED HYDRAULIC SYSTEM WITH ELECTROVISCOUS FLUIDS

This is a continuation of application Ser. No. 172,669, filed Mar. 24, 1988, now abandoned, which in turn is a continuation of application Ser. No. 019,894, filed Feb. 24, 1987, now abandoned.

BACKGROUND OF THE INVENTION

The invention concerns a device for the measuring and adjustment of the motion of mechanical structural members in hydraulic systems operating with electroviscous fluids (EVF). Such a device consists in principle of a flow channel filled with the electroviscous fluid and provided with electrodes, or of a closed system with electrodes which are moved with respect to each other, whereby in both cases there is electric voltage on the electrodes. These devices are shown in FIGS. 7 and 8 of GB 12 82 568. Structural members of this kind are used in electrically controlled active vibration absorbers, shock absorbers, mountings or couplings.

Electroviscous fluids (EVF) are dispersions of finely-distributed hydrophilic solids in hydrophobic oils which are not electrically conductive. Under the influence of an adequately strong electric field the viscosity of the EVF can be changed very quickly and reversibly from the fluid to the plastic or solid state. In order for the EVF to be excited, both constant electric fields and alternating fields can be used. The electricity outputs required for this are relatively low.

The application possibilities of the EVF in hydraulic systems are known in principle, for example in hydraulic valves without moving parts and in hydraulic cylinders (for example, U.S. Pat. No. 2,661,596), in vibration generators (for example U.S. Pat. No. 3,984,086), viscosity couplings (for example U.S. Pat. Nos. 2,417,850 and 2,661,825, DE-OS 3.128.959), shock absorbers (for example, U.S. Pat. No. 3,207,269) or twin-chamber engine bearings with hydraulic damping (EP-OS 0.137.112).

All these hydraulic systems are characterised in that they have at least two stationary or mobile electrode surfaces, structured as desired, between which the EVF is situated. By the application of variable electric voltage the speed of the flow of the fluid, for example, and thus the falling pressure of the EVF between the stationary electrodes or the frictional connection between mobile electrode surfaces can be controlled within broad ranges. For this purpose high-voltage industrial equipment, for example, with a constant or variable output voltage, can be used.

In a large number of cases of practical application, the automatic adjustment of the hydraulic system with a dependency on the conditions of motion at that time should be achieved. For example, in the case of a shock absorber or a vibration absorber, the viscosity of the EVF should always be set with the aid of the control voltage in such a way that a desired level of damping is attained for all loads. For this purpose a regulator circuit is necessary which can be sensitive to the condition of motion of the hydraulic system at the time with the aid of appropriate sensors (for example, transducers, speed sensors or acceleration sensors), and which produces the voltage necessary for optimal viscosity control using an algorithm.

Because of the need to build-in motion sensors of this type including the measuring cable and measuring instruments associated with them, the overall construction of the hydraulic system becomes more expensive, more complicated and, possibly, more susceptible to failure, in particular if the installation must take place in locations which are not easily accessible.

This is where the invention comes into its own. The basis was the object of finding a simple method of controlling and adjusting the hydraulic EVF system without the necessity of also incorporating motion sensors. It makes it possible for a simple, compact construction of the entire hydraulic system to be achieved.

SUMMARY OF THE INVENTION

This object is fulfilled according to the invention with the aid of the electrodes which are already present, which are used for the viscosity control of the EVF in the hydraulic system, and at the same time for the production of an electrical current signal, which signal is proportional, within a broad range, to the level of the flow speed of the EVF between stationary electrodes or is proportional to the level of relative speed of two or more electrodes which can be displaced with respect to each other and thus the EVF. In the first instance the electrical signal is attributable to the EVF flow as a result of its mechanical motion between the electrodes, whereas in the second case it is a displacement current which is produced by the motion of the electrodes in the polarized EVF. The EVF layer lying between the two electrodes, together with an electrical current measuring instrument in an external circuit, thus forms a motion sensor. The sensor signal can be used for the controlling or for the adjustment of the moving state of the hydraulic system, for example, for an adjustment dependent on speed and/or dependent on frequency of a shock absorber or a vibration absorber.

The signal which is dependent on the motion is preferably obtained by the measuring of the proportion of the electrical conducting capacity or conductance of the EVF between the electrodes, which is dependent on the motion. The measuring of the conducting capacity takes place by the measuring of the electrode voltage (for example, with a series of resistors which are connected as voltage distributors) and by the measuring of the electrode current (for example, by the measuring of the voltage drop in a series resistor which is switched into the electrode current circuit). In order to obtain an electrical signal which is analogous to the electrical conducting capacity, the measured current signal must be divided by the measured electrode voltage in a special circuit, for example a commercial, integrated divider module. The measuring signal obtained in this way can be used advantageously for the adjustment or controlling of the viscosity of the EVF layer. For this purpose the measuring signal corresponding to the conducting capacity of the EVF layer is compared with a desired value and the differential voltage is used for the controlling of a high-voltage device which supplies a variable output voltage which is dependent on the control voltage. The output voltage is applied to the electrodes of the EVF layer and, in its turn, influences the viscosity. In this adjustment operation it is not usual for the motion sensor, i.e. the EVF layer with the associated electrodes, to act as, at the same time, the actuator for influencing the motion.

If no adjustment is provided for and if the operations can be carried out with constant electrode voltage, the measured current in the external circuit is sufficient to realize a simple motion sensor.

The invention is based in principle on the observation that the current flowing through the EVF, at a constant temperature, does not only depend on the voltage applied, and the electrical field strength and the electrode geometry (electrode surface and distance between electrodes) respectively, but also on the relative speed of the EVF in relation to the electrodes. This applies both to an EVF flowing between two firmly fixed electrode surfaces (such as, for example, in an EVF hydraulic valve) and also to the relative speed of two electrode surfaces which move with respect to each other in an EVF (such as, for example, in a shock absorber which is filled with an EVF, the electrode surfaces of which can be formed from the internal cylinder surface area and the surface area of the piston which is moved). In both cases the EVF which is delimited by the electrode surfaces is exposed to a shearing action and/or a deformation which is proportional to the relative speed between electrodes and EVF. This shearing action effects a change in the electrical conducting capacity of the EVF in comparison to the quiescent condition. Since the EVF's are dispersions, amongst other things, various devices are possible which can lead to a change in the conducting capacity with the shearing speed of the deformation speed, for example, the destruction of a structure, the deformation of the ionic clouds surrounding the dispersed particles during the shearing action or electrophorectic devices for charge transfer.

The change in the conducting capacity with the shearing action speed or the deformation speed depends on whether a direct voltage or an alternating voltage is applied to the electrodes.

With direct voltage, amongst other things, a clear increase in the conducting capacity can be observed, and thus an increase in the measured electrical current with increasing speed of the shearing action, and in contrast with an alternating voltage, amongst other things, a decrease in the conducting capacity can be observed. A change in conducting capacity depends only on the level of the speed of the shearing action and not on its direction. This is clearly shown in periodic vibration movements of the fluid or of the electrodes such as occur, for example, in hydraulic shock absorbers, vibration absorbers or mountings.

In the drawings which follow, the way in which the measurement of motion according to the invention works is initially illustrated in greater detail on the basis of simple examples. Below these examples in other examples a description is given of how the motion signal, which is measured by the electrodes, can be used for the adjustment of the hydraulic system. The following are shown:

DETAILED DESCRIPTION OF THE INVENTION

Figure 1:
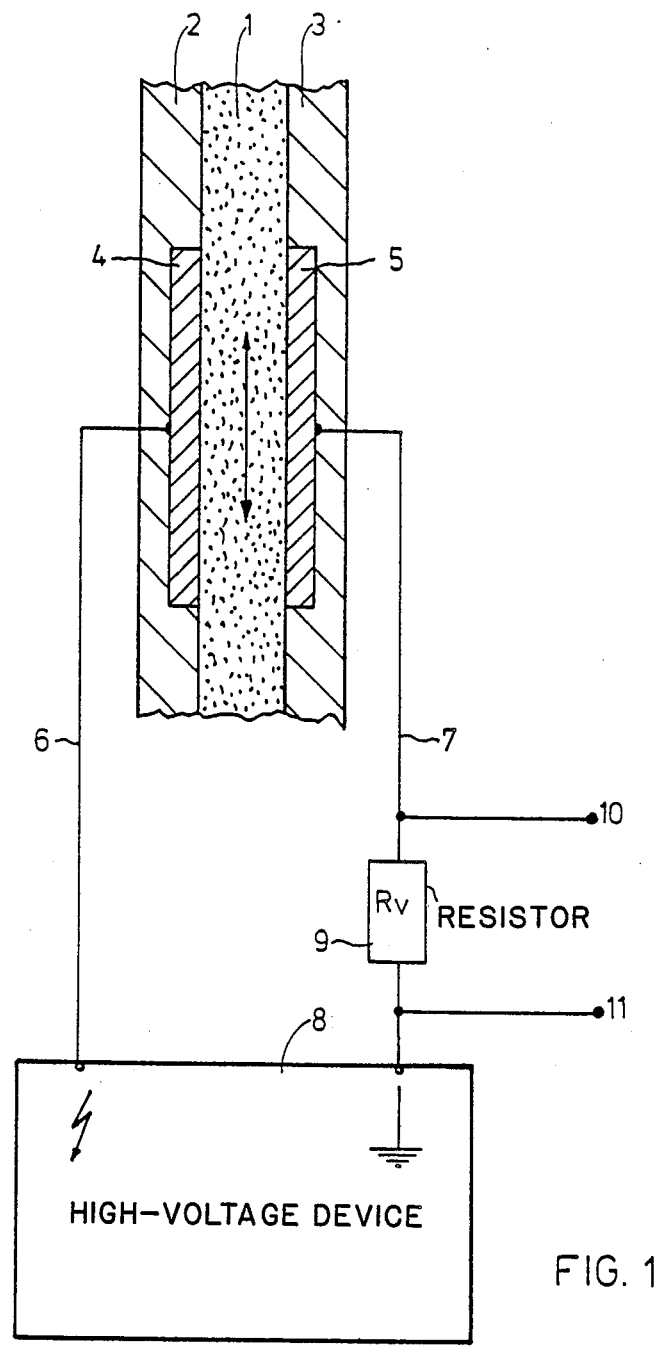
FIG. 1 shows a schematic longitudinal section through a part of a hydraulic system filled with an electroviscous fluid, with two fixed electrodes and a circuit for the measurement of the measured current.

According to FIG. 1 the EVF is in a channel 1 which is defined by the walls 2 and 3, and which, for example, connects the two chambers of a hydraulic shock absorber, a vibration absorber or a hydraulic two-chamber motor bearing with each other. The electrodes 4 and 5 which are isolated and built into walls 2 and 3, are connected with a high-voltage device 8 via lines 6 and 7, with the help of which device any constant direct voltage U which is desired, and field strength, E, is set. For the measuring of the electrical current the most simple method is the wiring of a resistor $R_v 9$, of the appropriate value, into the near ground line 7 and the measuring of the signal voltage $U_{Sign.} = R_v I$ which is proportional to the current I between points 10 and 11. (Some commercial high-voltage devices already have an analogue current monitor on the low-voltage side).

Figure 2A:
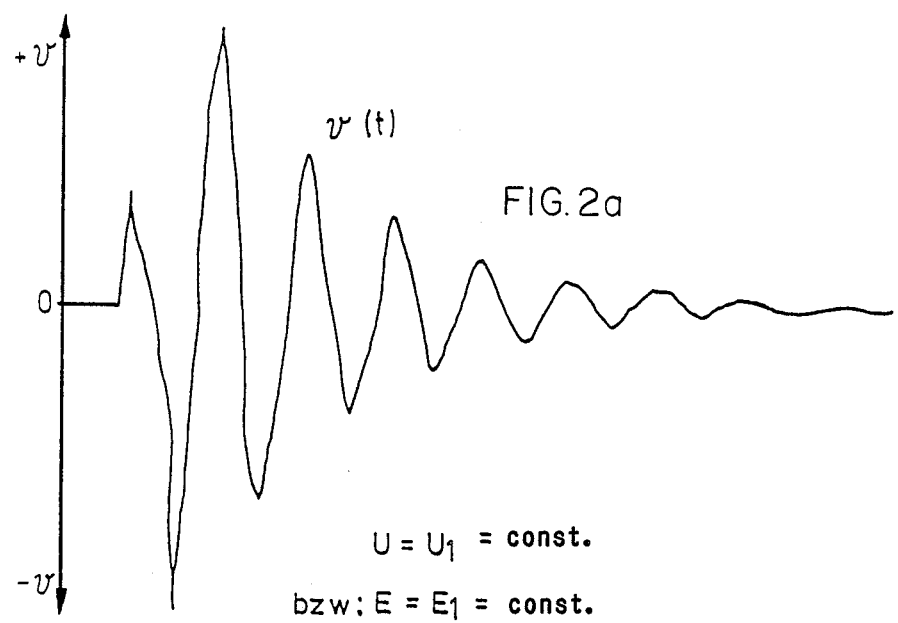
FIG. 2 shows the relationship between the speed (graph a) at which the EVF flows through the flow channel of the hydraulic system and the electrical current signal (graph b) measured at the same time at a constant electrode voltage.
Figure 2B:
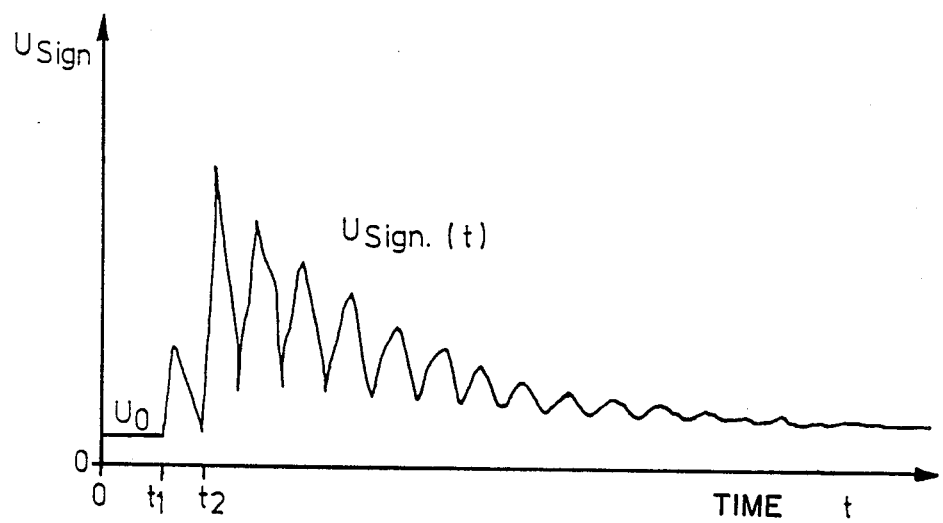

FIG. 2 shows, in a typical example from practice, the relationship between the speed v(t) at which the EVF flows through channel 1 and the signal $U_{Sign.}(t)$ which is measured with a constant electrode voltage $U = U_1$, at the same time and is thus directly proportional to changes in current. At the time when $t=0$ to $t=t_1$ the hydraulic system (for example, a hydraulic two-chamber bearing) is at rest (v=0). A relatively small quiescent current $I_o$ flows, which produces the signal voltage $U_o$ in the resistor 9. In the interval in time $t_1$ to $t_2$ an external force triggers the hydraulic system and this system vibrates freely for $t > t_2$ with a consequence of positive and negative vibration amplitudes v(t) (graph a). The signal $U_{Sign.}(t)$ follows the progression of the flow speed with close proximity but independently of the direction of the flow with the result that only a series of signal amplitudes with the same polarity sign is observed in graph b. The proportion of the signal which is dependent on the motion is the difference $U_{Sign.}(t) - U_o$ which, at a constant electrode voltage $U = U_1$, is proportional to the level of the flow velocity v(t), i.e. the following relationship applies:

$$/V(t)/ \approx A \cdot (U_{Sign.}(t) - U_o) \qquad (1)$$

with the proportionality factor A, which can be determined by trial for each hydraulic system.

Figures 3A, 3B:
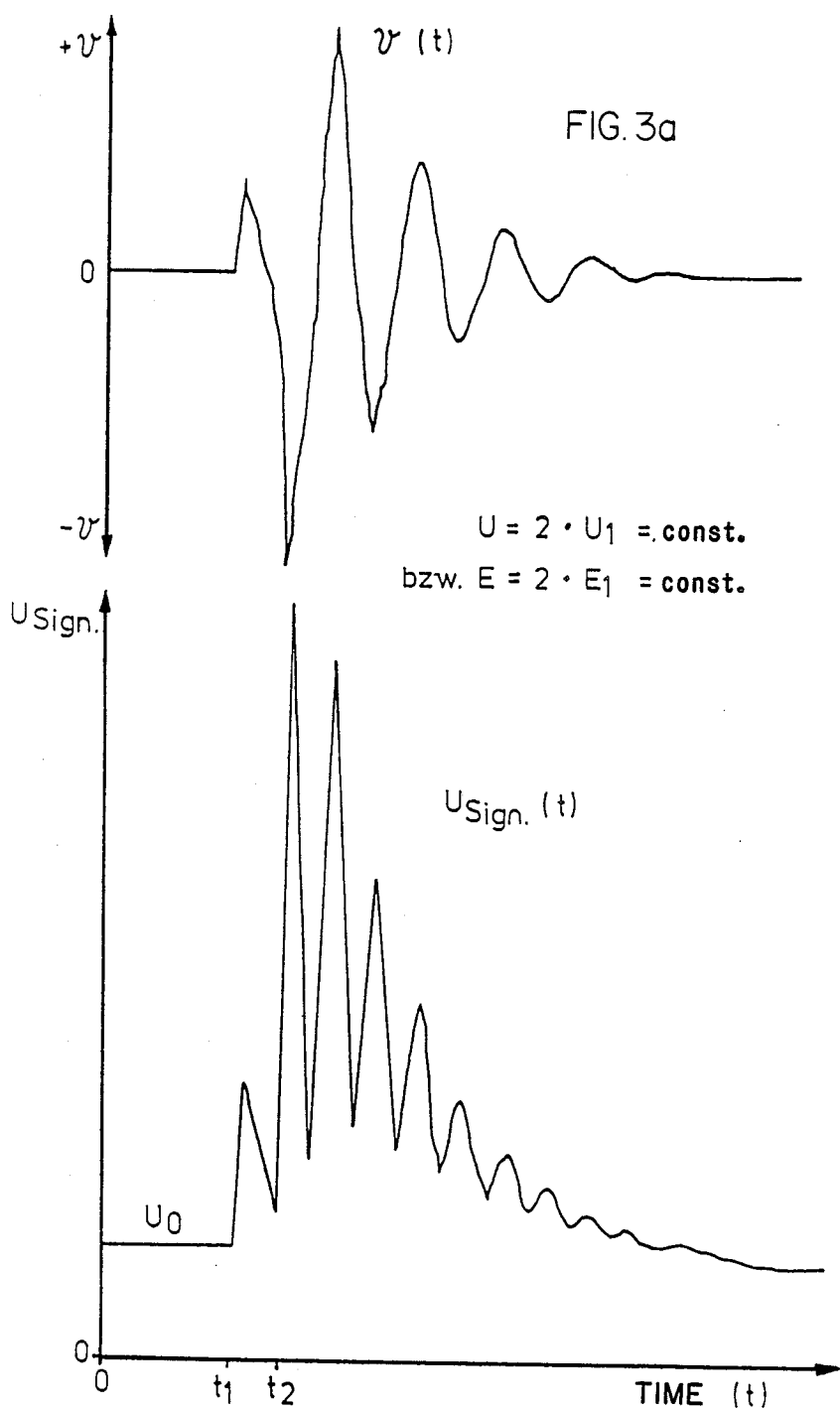
FIG. 3 shows the same relationship as in the test according to FIG. 2, but with an electrode voltage which is twice as great as that of FIG. 2.

In practice the hydraulic system is operated with various electrode voltages in order that the viscosity of the EVF might be suitably adjusted for the requirements at that time. It was found that there was a voltage dependency of the current, which dependency can be measured for the EVF. As a first approximation, however, proportionality between the and/or current signal and electrode voltage can be assumed as can be seen if graphs (b) in FIG. 2 and b in FIG. 3 are compared. In FIG. 3 the trial described above was repeated with twice the electrode voltage $U=2\cdot U_1$ in conditions which were otherwise the same. With comparable amplitudes of the flow velocity v(t), the signal $U_{Sign.}(t)-U_o$ now becomes rather more than twice as high as in graph b in FIG. 2 and thus the quotient arising out of current and voltage which corresponds to the electrical conductance can be used as an approximate measure for the velocity of the EVF flow. Instead of relationsip (1) this approximation equation applies:

$$/V(t)/ A \cdot \frac{U_{Sign.}(t) - U_o}{U(t)} \qquad (2)$$

In (2) the electrode voltage can also be variable in terms of time: $U=U(t)$.

Figure 4:
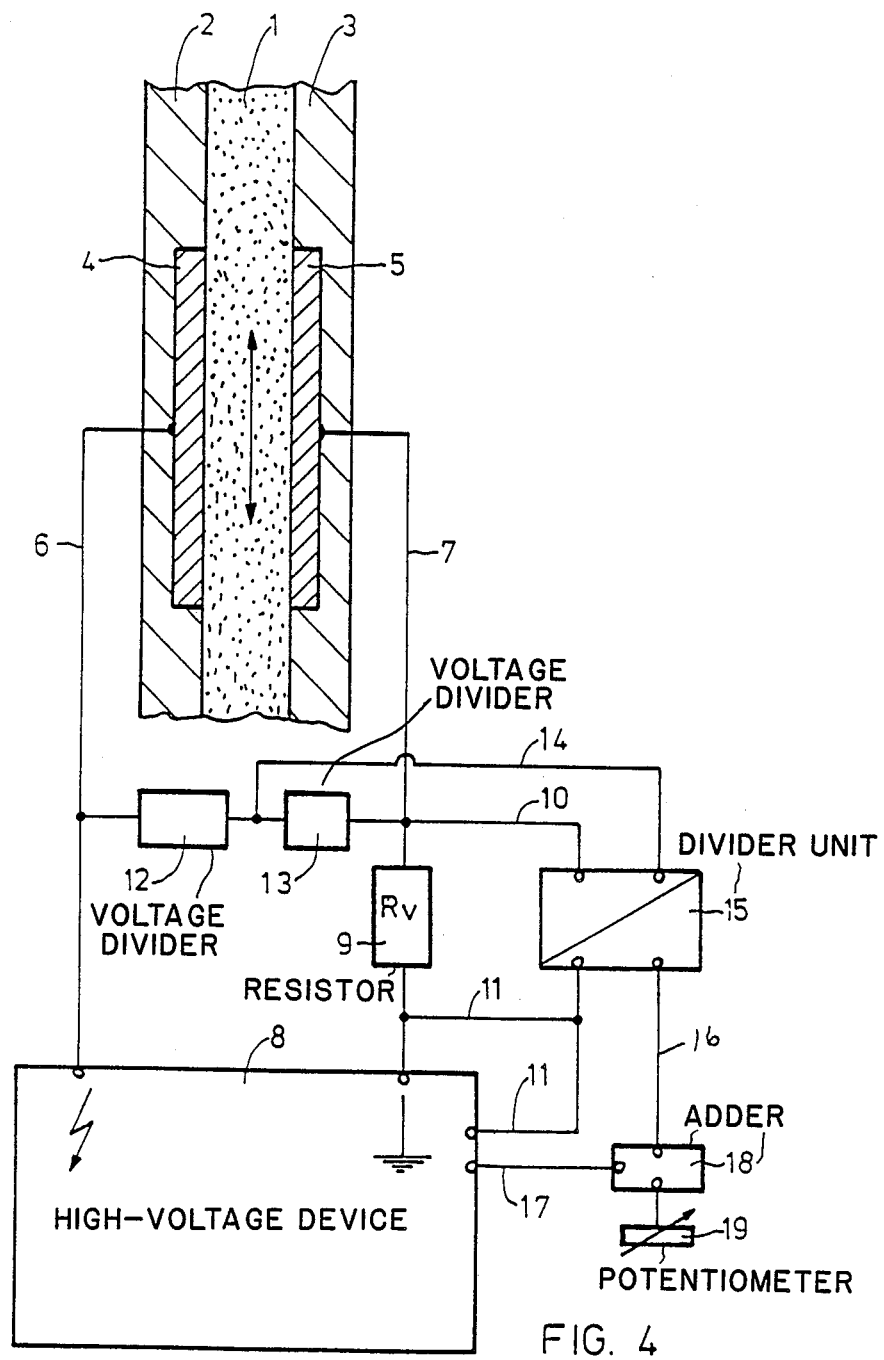
FIG. 4 shows a circuit for the measuring of the conducting capacity of the electroviscous fluid with an automatic readjustment of the electrode voltage and thus of the attenuation of the hydraulic system.

For the practical application of the relationship (2) to the controlling and adjustment of the condition of motion of a hydraulic system, the division of the proportion of the signal $U_{Sign.}(t)-U_o$ which is dependent on the motion can be carried out digitally by the electrode voltage U(t) either analogously or with the aid of AD-, and/or DA-converters and microprocessors respectively, also digitally. For this purpose the high voltage U(t) applied to the electrodes must be first divided down using appropriate voltage dividers into the low voltage area. Some commercial high-voltage devices already have a voltage monitor low voltage side (for example, 0–10 V), which can be used for these purposes. The high-voltage device (8) must also have an appropriate analogue control input by means of which the required high voltage can be set. The simplest way of carrying out the analogue division of the signal $U_{Sign}$ and the voltage monitor signal U(t) is to use a commercial integrated divider unit such as is shown in FIG. 4. The electrode voltage in the resistors 12 and 13 of the voltage divider, as measured, is taken via line 14, and the current in resistor 9 is taken via connection 10 to the divider unit 15. The quotient of the two analogue signals is available at a low voltage side 16 as an analogue signal and can be placed on the control input 17 of the high-voltage device 8 after the corresponding conversion or amplification for controlling the high voltage. In order for the sensor according to the invention to be operated, a relatively low voltage must be applied to electrodes 4 and 5 even when the hydraulic system is in the quiescent condition. This bias voltage can be set, for example, by using the adder 18 and the potentiometer 19. It is advisable for the bias voltage to be set in such a way that the field strength E resulting from it in the EVF remains below a threshold strength $E_o$ and, therefore, no further increase in viscosity that is worthy of note occurs. When the hydraulic system moves as a result of the external effects of a force the EVF moves between the electrodes 4 and 5, which is shown by the change in the conducting capacity associated with this, and which is changed by the circuit into a corresponding control signal. The control signal can, for example, effect an increase in the output voltage of the high-voltage device 8, which leads to a corresponding increase in the viscosity of the EVF and thus to a greater attenuation of the hydraulic system. The increase in electrical current which is associated with the increase in voltage in an EVF fluid as noted earlier is compensated for in divider unit 15 (which divides the two valves) with the result that a continuing increase of the electrode voltage by feedback is avoided. When the conductance decreases as a result of the higher attenuation of the hydraulic system, the electrode voltage also diminishes to the initial value set. One particular advantage of this adjustment is the fact that the EVF layer forms the error-sensing element and, at the same time, the system actuator with electrodes 4 and 5. In this system, the measuring signal is present, as described above, as the conductance of the EVF layer compared with a desired level and the adjustment signal is the output voltage of the high-voltage device 8 which is dependent on the measuring signal.

Figure 5:
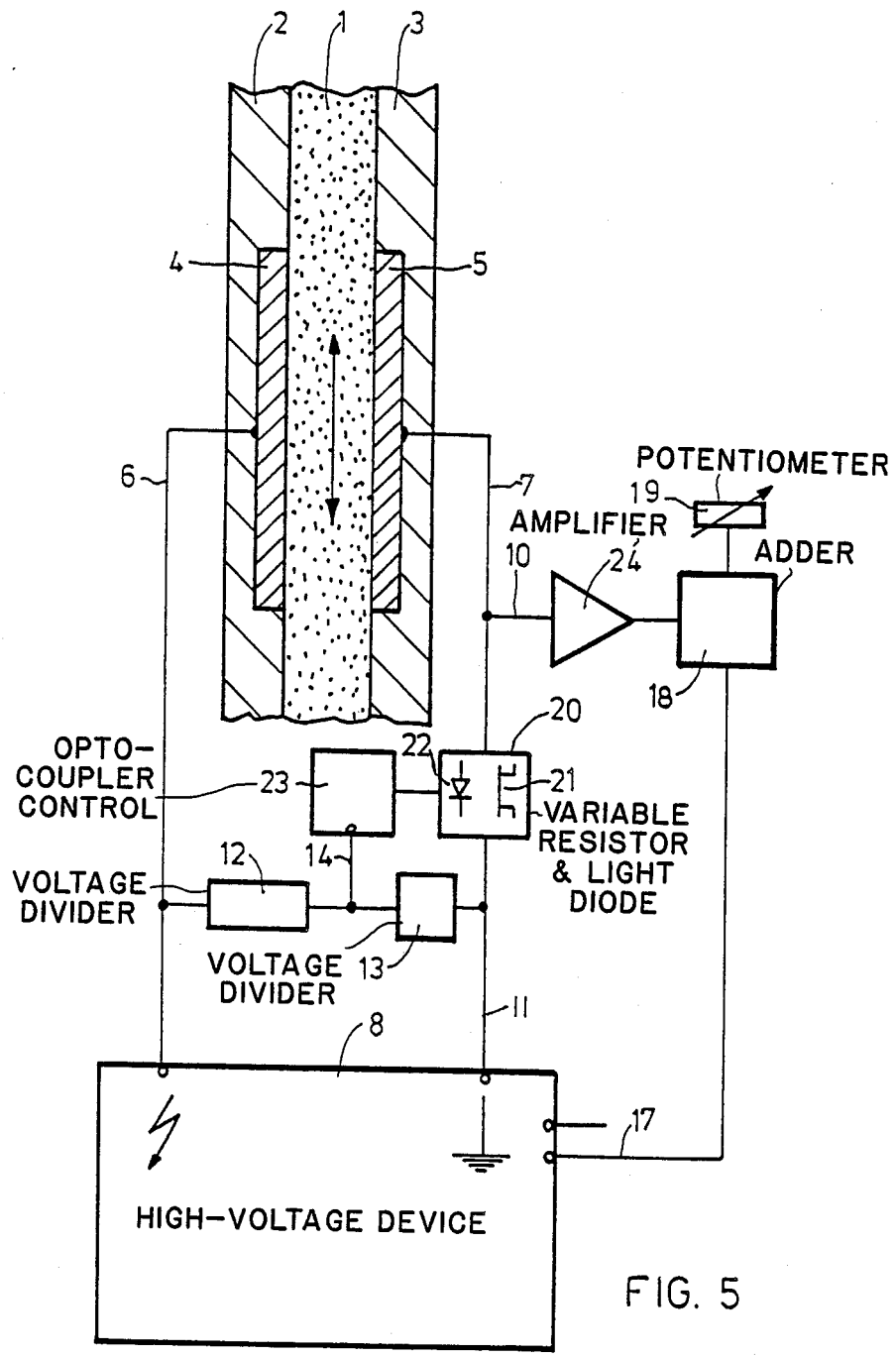
FIG. 5 shows another circuit for the division of the measured current signal by the measured voltage signal using an optocoupler and the readjustment of the electrode voltage.
Figure 6A:
FIG. 6 shows the relationship between the rate at which the EVF flows through a current channel (graph a) and the electrical current signal measured (graph b), if the increase in the current signal with increasing electrode voltage is precisely compensated for (graph c) with a circuit according to FIG. 4 and FIG. 5 and FIG. 7 Principally shows the same relationship as in FIG. 2, but in the case of an operation of the electrodes with an alternating voltage of constant amplitude.
Figure 6B:
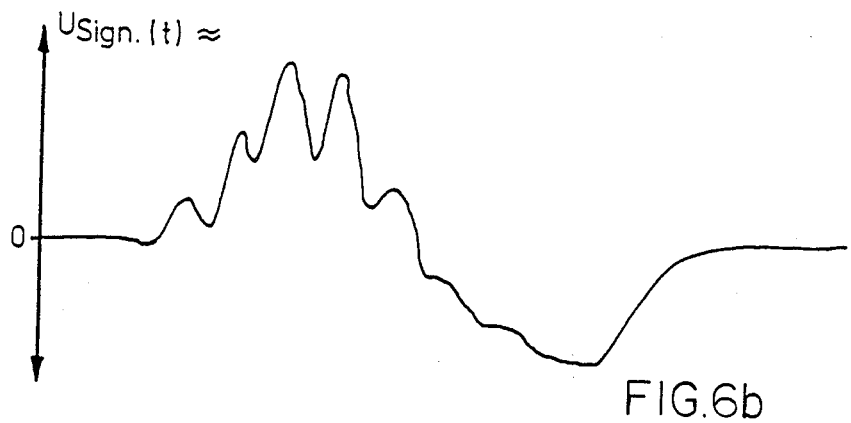
Figure 6C:
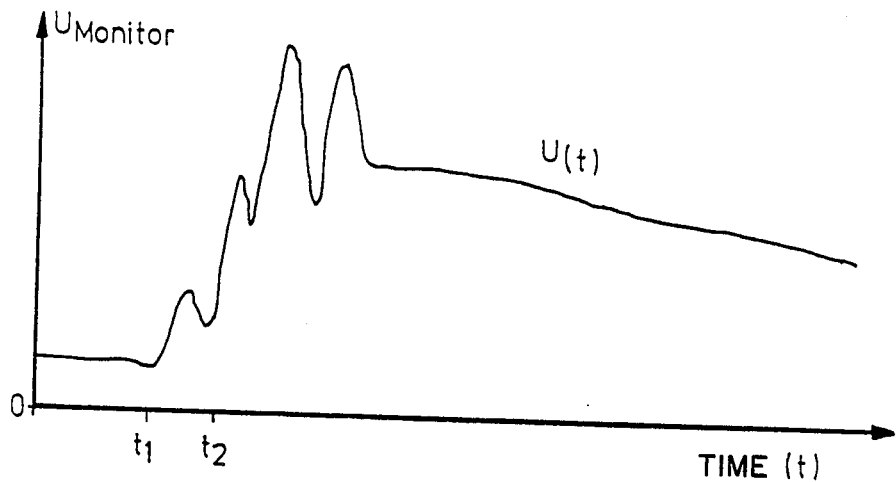

FIG. 5 shows another circuit for carrying out the analogue division of the signal $U_{Sign}$ and the voltage monitor signal U(t) and their application to the adjustment of the hydraulic system. Instead of the fixed load resistor $R_v$ 9, an optocoupler 20 with a variable resistor 21, which is controlled using the luminosity of a light diode 22, is connected into line 7. The electrode voltage measured in the voltage divider 12,13 as the monitor voltage is used for the controlling of the variable load resistor $R_v$ via 14 and the optocoupler control 23. In this way the load resistance becomes smaller with increasing electrode and monitor voltage, and thus also the voltage drop caused by the current in resistor 21 decreases (t) with the result that the increase in the $U_{Sign}$ signal is compensated for precisely with increased electrode voltage. The operation of this circuit corresponds to that described above. FIG. 6 shows an example of this. The trial described in FIGS. 1 and 2 was repeated with the circuit in FIG. 5. The bias voltage of electrodes 4 and 5 was set when the hydraulic system (graph a) was in the quiescent condition. The system was triggered at time $t_1$. Graph b in FIG. 6 shows the progress in time of the voltage drop on multiplier resistor 21 of the optocoupler, which voltage drop had been amplified using amplifier 24 (instead of the difference $U_{Sign.}(t)-U_o$ the alternating voltage proportion of the signal $U_{Sign.}(t)$ was used). Graph c shows the progress of the monitor voltage of the high-voltage device 8 which is proportional to the electrode voltage U(t). The electrode voltage is increased and/or decreased with decreasing signal amplitude, i.e. decreasing speed, when the motion in graph a corresponding to the signal amplitude is started. Because of the low level of conducting capacity of the EVF in the quiescent condition, the discharging of the high-voltage device accordingly lasts for a long time.

Figures 7A, 7B:
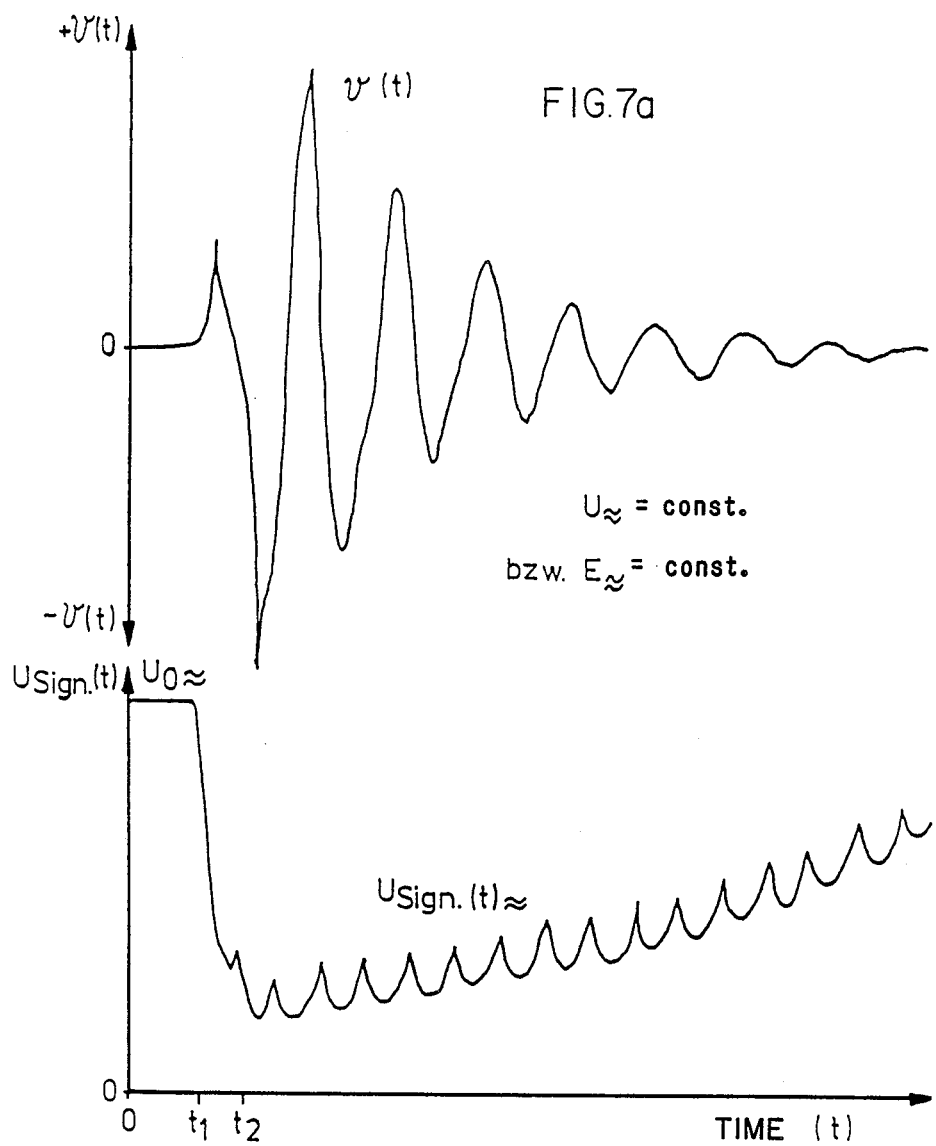

FIG. 7 demonstrates that changes in the electrical conductance and/or the current with the flow velocity of the EVF and/or the relative speed of the electrodes in relation to the EVF can also be observed when the electrodes are operated with alternating voltage. Graph a shows the time behavior of the flow velocity v(t) and curve b, shows the time behavior of the alternating current amplitude (after rectification and smoothing). In the quiescent condition $t=0$ to $t=t_1$ $U_o$ is relatively high. At the start of the motion at $t=t_1$ the alternating current conductance decreases and thereafter increases gradually with the decrease in vibration and therefore the voltage increases gradually to the previous level. Here, a relative minimum of the conductance value corresponds to a maximum of the flow velocity valve in graph a.

The relationship between electrical current and velocity is not linear here. Even the change in conducting capacity can be used for adjustment in appropriate circuits according to FIGS. 4 and 5. The frequency of the alternating voltage should, however, be greater in this process than the frequency of the mechanical vibrations to be controlled.

The examples given already show that the current and voltage signals measured on the electrodes are converted with simple electronic circuits and can be used for the measuring and adjusting of the condition of motion of a hydraulic system. The circuits can also be improved as desired and can be adapted to the requirements at that time, for example, the simple division of the current signal by the voltage monitor signal can be replaced by a more precise electronic simulation of the measured current-voltage steady state characteristic of the EVF. Preferably the invention can be applied in hydraulic systems in which control or adjustment which is dependent on the speed is required, for example in vibration absorbers, shock absorbers or mountings, since the attenuation is proportional to the speed at which the hydraulic fluid flows.

The changes in the current and the conducting capacity respectively can be observed not only in very considerable changes in the speed at which the EVF flows through and/or the relative speed, but also in very slight shaking of the system in which the EVF only makes oscillatory movements of very small amplitudes between the electrodes.

In order for the adjustment of the hydraulic system to be further improved, with the aid of the signals measured, not only the amplitude but also the frequency of the vibrations of a system can be measured and used for adjustment purposes. For this purpose the current signal is applied in parallel to a commercial frequency meter, a frequency analyzer or the appropriate electronic circuits (filters, discriminators etc), not shown.

We claim:

1. A hydraulic system comprising: means forming a fluid flow channel, an electroviscous fluid in the flow channel, a structural member relatively movable with respect to the fluid for imparting flow to the fluid relative to the flow channel, electrodes in contact with the fluid, means for applying an electrical voltage to the electrodes to vary the viscosity of the fluid, and circuit means connected to the means for applying a voltage to the electrodes for sensing the electrical current across the electrodes to produce a signal corresponding to the flow of the fluid and thereby corresponding to the relative movement of the structural member.

2. The system according to claim 1, wherein the circuit means comprises a load resistor in series with the means for applying a voltage to the electrodes.

3. The system according to claim 2, wherein the circuit means further comprises means for sensing the voltage across the electrodes and means for dividing the current across the electrodes by the voltage across the electrodes to produce a signal corresponding to the conductance of the fluid between the electrodes and thereby the current across the electrodes, whereby the conductance signal corresponds to the relative movement of the structural member.

4. The system according to claim 3, wherein the means for applying the voltage across the electrodes comprises a controllable power supply having a control input for varying the voltage across the electrodes and further comprising means applying the signal corresponding to the conductance to the control input to vary the voltage across the electrodes in response to the sensed movement of the structural member.

5. The system according to claim 1, wherein the means for applying the voltage across the electrodes comprises a controllable power supply having a control input for varying the voltage across the electrodes and further comprising means applying the signal corresponding to the flow to the control input to vary the voltage across the electrodes in response to the sensed movement of the structural member.

6. The system according to claim 1, wherein the circuit means comprises means for sensing the voltage across the electrodes, optoelectric coupling means receptive of the sensed voltage and including a variable resistor in series with the means for applying the voltage across the electrodes and which varies in response to the magnitude of the sensed voltage and means for sensing the voltage drop across the variable resistor for producing a signal corresponding thereto and thereby the current across the electrodes, whereby the voltage drop signal corresponds to the relative movement of the structural member.

7. The system according to claim 6, wherein the means for applying the voltage across the electrodes comprises a controllable power supply having a control input for varying the voltage across the electrodes and further comprising means applying the signal corresponding to the voltage drop to the control input to vary the voltage across the electrodes in response to the sensed movement of the structural member.

8. The system according to claim 1, wherein the electrodes are fixed relative to each other.

9. The system according to claim 1, wherein the electrodes are movable relative to each other.

* * * * *